(12) United States Patent
Sanada

(10) Patent No.: US 8,125,717 B2
(45) Date of Patent: Feb. 28, 2012

(54) THREE-DIMENSIONAL LEFT-HANDED METAMATERIAL

(75) Inventor: Atsushi Sanada, Yamaguchi (JP)

(73) Assignee: Yamaguchi University, Yamaguchi-shi (JP)

( * ) Notice: Subject to any disclaimer, the term of this patent is extended or adjusted under 35 U.S.C. 154(b) by 213 days.

(21) Appl. No.: 12/526,573

(22) PCT Filed: Mar. 14, 2008

(86) PCT No.: PCT/JP2008/054729
§ 371 (c)(1),
(2), (4) Date: Aug. 10, 2009

(87) PCT Pub. No.: WO2008/120556
PCT Pub. Date: Oct. 9, 2008

(65) Prior Publication Data
US 2010/0118412 A1 May 13, 2010

(30) Foreign Application Priority Data
Mar. 29, 2007 (JP) .................................. 2007-088679

(51) Int. Cl.
| | |
|---|---|
| *G02B 11/00* | (2006.01) |
| *G02B 13/00* | (2006.01) |
| *G02B 15/00* | (2006.01) |
| *G02B 17/00* | (2006.01) |
| *G02B 25/00* | (2006.01) |
| *G02B 3/00* | (2006.01) |
| *G02B 7/00* | (2006.01) |
| *G02B 9/00* | (2006.01) |
| *G02F 1/29* | (2006.01) |

(52) U.S. Cl. ........................................ 359/642; 359/315
(58) Field of Classification Search .................. 359/642, 359/315
See application file for complete search history.

(56) References Cited

U.S. PATENT DOCUMENTS
| | | | |
|---|---|---|---|
| 7,218,285 B2 | 5/2007 | Davis et al. | |
| 7,718,953 B2 * | 5/2010 | Prather et al. | ................. 250/251 |
| 2006/0028385 A1 | 2/2006 | Davis et al. | |

OTHER PUBLICATIONS

M.S. Silveirinha, et al., "Homogenization of 3-D-Connected and Nonconnected Wire Metamaterials", IEEE Trans. Microwave Theory and Techniques, 2005, pp. 1418-1430, vol. 53, No. 4.
V. Yannopapas, "Negative Index of Refraction in Artificial Chiral Materials", Journal of Physics, Jul. 26, 2006, pp. 6883-6890, vol. 18, No. 29.
International Search Report of PCT/JP2008/054729, Mailing Date of Apr. 15, 2008.

* cited by examiner

*Primary Examiner* — Alicia M Harrington
(74) *Attorney, Agent, or Firm* — Westerman, Hattori, Daniels & Adrian, LLP

(57) ABSTRACT

A three-dimensional left-handed metamaterial having a completely new constitution, which functions as a three-dimensional electromagnetic wave propagation medium and in which an equivalent permittivity and a permeability of the medium simultaneously take negative values. The three-dimensional left-handed metamaterial is structured such that cubic unit cells 5 are disposed repeatedly in three orthogonal directions of a three-dimensional space, and includes: a first particle 1 constituted by a conductor and disposed in positions centering on respective vertices of the unit cell; a second particle 2 constituted by a conductor and disposed in positions centering on face center points, which are centers of respective faces of the unit cell; a first connecting portion constituted by a conductor, which connects the first particles to a center point of the unit cell; and a second connecting portion constituted by a conductor, which connects the second particles to the center point.

8 Claims, 4 Drawing Sheets

THREE-DIMENSIONAL LEFT-HANDED METAMATERIAL

TECHNICAL FIELD

The present invention relates to an artificial material (metamaterial) for propagating electromagnetic waves, and more particularly to a three-dimensional left-handed metamaterial that functions as a three-dimensional electromagnetic wave propagation medium in which both an equivalent permittivity and a permeability of the medium are negative.

BACKGROUND ART

A material having properties that do not exist in nature can be constructed artificially by arranging chips (unit structures) of metal, dielectric material, magnetic material, superconducting material, and so on at sufficiently short intervals relative to the wavelength (no more than approximately one tenth of the wavelength). This type of material belongs to a larger category than a category of materials found in nature, and is therefore known as a metamaterial. The properties of a metamaterial vary according to the shape, material, and arrangement of the unit structure.

Among such metamaterials, a metamaterial in which an equivalent permittivity $\in$ a permeability $\mu$ are simultaneously negative is known as a "left-handed material (LHM)" since the electric field, magnetic field, and wave vector thereof form a left-handed system. In this specification, a left-handed material is referred to as a left-handed metamaterial. In contrast, a normal material in which the equivalent permittivity $\in$ and permeability $\mu$ are simultaneously positive is known as a "right-handed material (RHM)". As shown in FIG. 1, a relationship region between the material and the permittivity $\in$ and permeability $\mu$ can be divided into first through fourth quadrants corresponding to the sign of the permittivity $\in$ and the sign of the permeability $\mu$. A right-handed material is a material belonging to the first quadrant, and a left-handed material is a material belonging to the third quadrant.

A left-handed metamaterial possesses particularly idiosyncratic properties such as the existence of a wave (known as a backward wave) in which the signs of the group velocity (the speed at which energy is propagated) and phase velocity (the speed at which a phase advances) of the wave are reversed, and evanescent wave amplification, an evanescent wave being a wave that decays exponentially in a non-propagation region. A line that transmits backward waves generated by a left-handed metamaterial can also be constructed artificially. This is described in the following Non-Patent Document 1 and Non-Patent Document 2, and is therefore well known.

A line on which backward waves are propagated by arranging unit cells constituted by a metallic pattern periodically has been proposed on the basis of this concept of left-handed material construction. This transmission characteristic has been handled theoretically up to the present time, and hence the facts that the line possesses a left-handed transmission band, a band gap occurs between the left-handed transmission band and a right-handed transmission band, the width of the band gap can be controlled in accordance with reactance in the unit cell, and so on have become theoretically evident. These points are described in the following Non-Patent Document 3.

[Non-Patent Document 1]
D. R. Smith, W. J. Padilla, D. C. Vier, S. C. Nemat-Nasser, and S. Schultz, "Composite medium with simultaneously negative permeability and permittivity," Phys. Rev. Lett., vol. 84, no. 18, pp. 4184-4187, May 2000

[Non-Patent Document 2]
C. Caloz, and T. Itoh, "Application of the transmission line theory of left-handed (LH) materials to the realization of a microstrip LH line," IEEE-APS Int'l Symp. Digest, vol. 2, pp. 412-415, June 2002

[Non-Patent Document 3]
Atsushi Sanada, Christophe Caloz and Tatsuo Itoh, "Characteristics of the Composite Right/Left-Handed Transmission Lines," IEEE Microwave and wireless Component Letters, Vol. 14, No. 2, pp. 68-70, February 2004

Left-handed metamaterials can be broadly divided into resonant materials and non-resonant materials, depending on the constitution thereof. The initially created left-handed metamaterials were resonant materials formed from a combination of a wire resonator and a split ring resonator. This left-handed metamaterial can be made three-dimensional by arranging the wire resonator and the split ring resonator in three orthogonal axis directions, i.e. x, y and z axis directions. This left-handed metamaterial uses a region in which both the effective permittivity of the wire resonator (an artificial dielectric material) and the effective permeability of the split ring resonator (an artificial magnetic material) are negative in the vicinity of the resonance frequency. Therefore, this type of material is disadvantaged in that the frequency bandwidth in which the material functions as a left-handed material is narrow. Moreover, since a frequency in the vicinity of the resonance frequency is used, an increase in loss occurs.

In contrast, a non-resonant left-handed metamaterial is based on a transmission line characteristic according to which a distributed inductance (L) and a distributed capacitance (C) of the transmission line of a normal material are reversed. In a transmission line having reversed distributed constants LC, the aforementioned backward waves are transmitted, and therefore the line exhibits the properties of a left-handed metamaterial. The frequency bandwidth in which a non-resonant left-handed metamaterial functions as a left-handed material is wider than that of a resonant left-handed metamaterial, and therefore a reduction in loss is achieved.

A transmission circuit employing a lumped constant LC element (a chip inductor, a chip capacitor, and so on) and a distributed constant type material in which periodical structures are disposed on a transmission line have been used as non-resonant left-handed metamaterials. However, there is an upper limit to the operation frequency of a material employing a lumped constant LC element (operations are only possible at or below the self-resonant frequency of the element), and it is therefore difficult to realize a left-handed metamaterial that operates at or above several GHz. Further, this type of material uses a large number of lumped constant LC elements, and is therefore difficult and expensive to manufacture.

In any case, non-resonant left-handed metamaterials are limited to materials that function as one-dimensional or two-dimensional electromagnetic wave propagation media. These one-dimensional and two-dimensional non-resonant left-handed metamaterials require an earth conductor, and therefore a three-dimensional non-resonant left-handed metamaterial created from a similar idea is constitutionally complicated and has not yet been realized.

DISCLOSURE OF THE INVENTION

It is therefore an object of the present invention to provide a three-dimensional left-handed metamaterial having a completely new constitution, which functions as a three-dimensional electromagnetic wave propagation medium by means of a simple constitution, and in which the equivalent permittivity and permeability of the medium simultaneously take negative values.

To achieve this object, a three-dimensional left-handed metamaterial according to the present invention is a three-dimensional left-handed metamaterial structured such that cubic unit cells are disposed repeatedly in three orthogonal directions of a three-dimensional space, and includes: a first particle constituted by a conductor and disposed in positions centering on respective vertices of the unit cell; a second particle constituted by a conductor and disposed in positions centering on face center points, which are centers of respective faces of the unit cell; a first connecting portion constituted by a conductor, which connects the first particles to a center point of the unit cell; and a second connecting portion constituted by a conductor, which connects the second particles to the center point.

In the three-dimensional left-handed metamaterial described above, the first particles and the second particles are preferably spheres.

Further, in the three-dimensional left-handed metamaterial described above, a radius of the spheres constituting the first particles and the second particles is preferably between 0.20 and 0.30 times a dimension of one side of the unit cell.

Further, in the three-dimensional left-handed metamaterial described above, the dimension of one side of the unit cell is preferably no greater than 0.5 times a wavelength of a propagated electromagnetic wave in a vacuum.

Further, the three-dimensional left-handed metamaterial described above may be formed as a lens made of a material having a negative refractive index and caused to function as a lens capable of realizing a resolution that exceeds a diffraction limit.

By being constituted in the manner described above, the present invention exhibits the following effects.

According to the present invention, a three-dimensional left-handed metamaterial which functions as a three-dimensional electromagnetic wave propagation medium and in which the equivalent permittivity and permeability of the medium simultaneously take negative values can be realized. Using this three-dimensional left-handed metamaterial, various applied equipment and devices, including a superlens, a lens antenna employing the superlens, and a coupler or a resonator employing a dispersion characteristic, can be realized.

Figure 1:
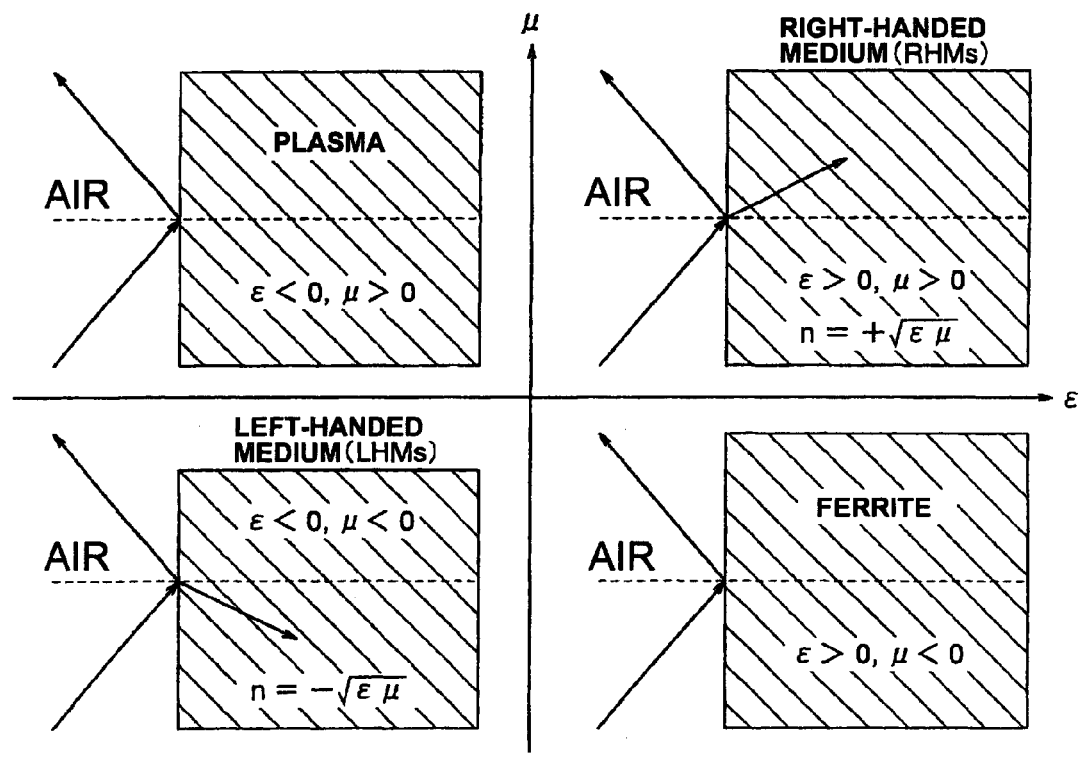
FIG. 1 is a view showing a relationship between materials and sign regions of a permittivity 531 and a permeability μ.

DESCRIPTION OF REFERENCE SYMBOLS 1 first particle
2 second particle
3 first connecting portion
4 second connecting portion
5 unit cell
6 metamaterial
50 center point
51 vertex
52 face center point

BEST MODES FOR CARRYING OUT THE INVENTION

Figure 2:
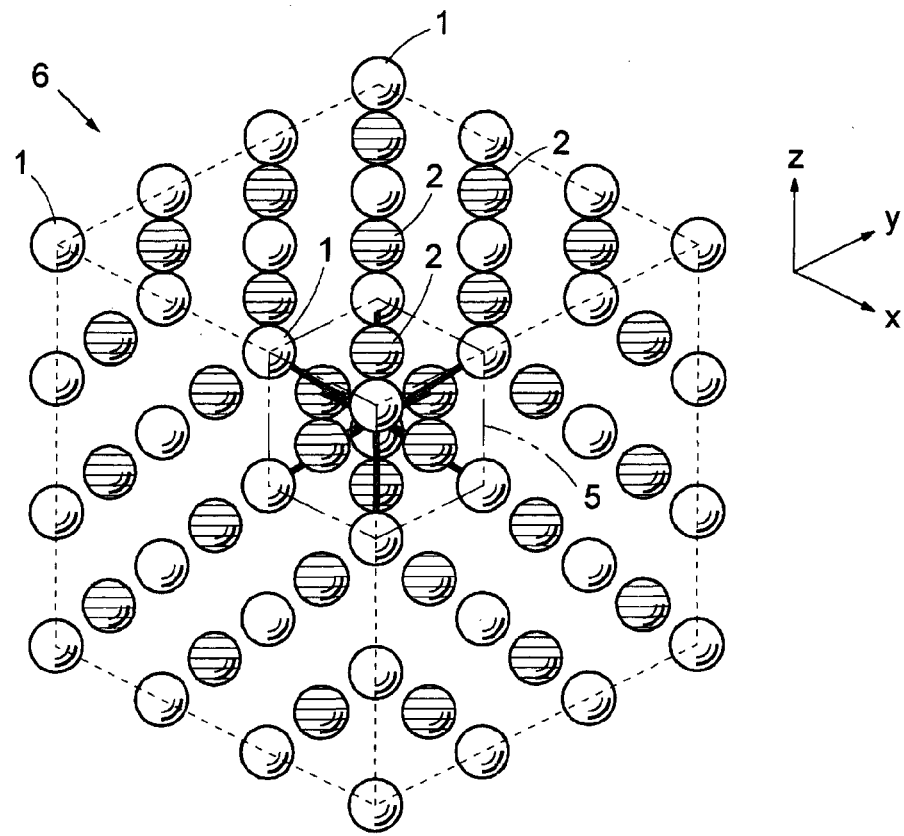
FIG. 2 is a perspective view showing the constitution of a metamaterial 6 according to the present invention.

An embodiment of the present invention will now be described with reference to the drawings. FIG. 2 is a perspective view showing the constitution of a metamaterial 6 according to the present invention. FIG. 2 shows the overall constitution of the metamaterial 6, and therefore details and interior constitutions are not illustrated accurately. The metamaterial 6 is structured such that cubic unit cells 5 are disposed in close contact repeatedly in three directions (xyz axis directions) that are orthogonal to each other in a three-dimensional space.

Figure 4:
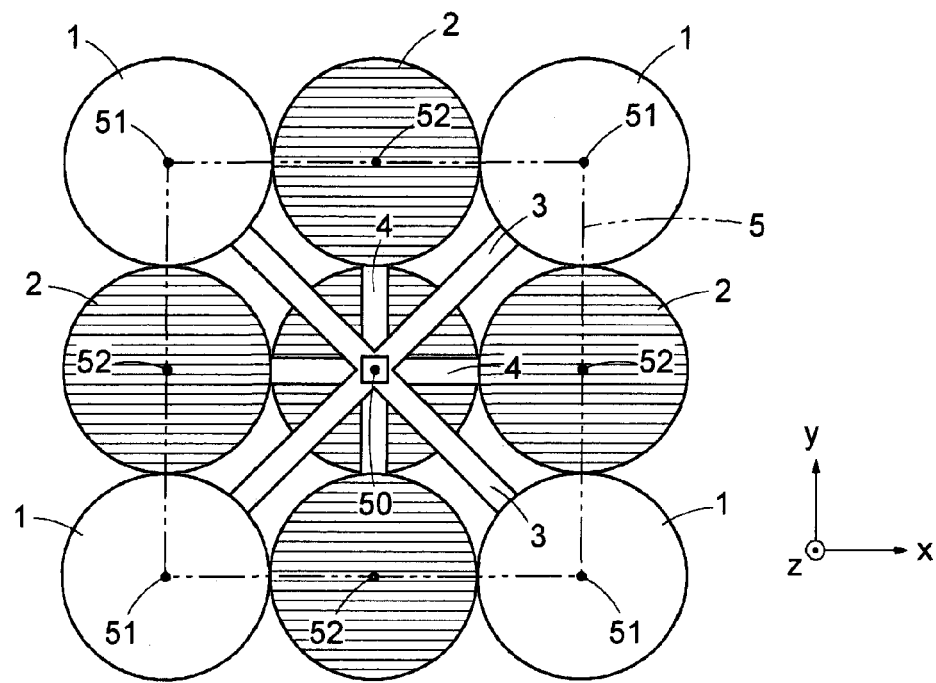
FIG. 4 is an enlarged plan view showing the metamaterial 6 from above.
Figure 5:
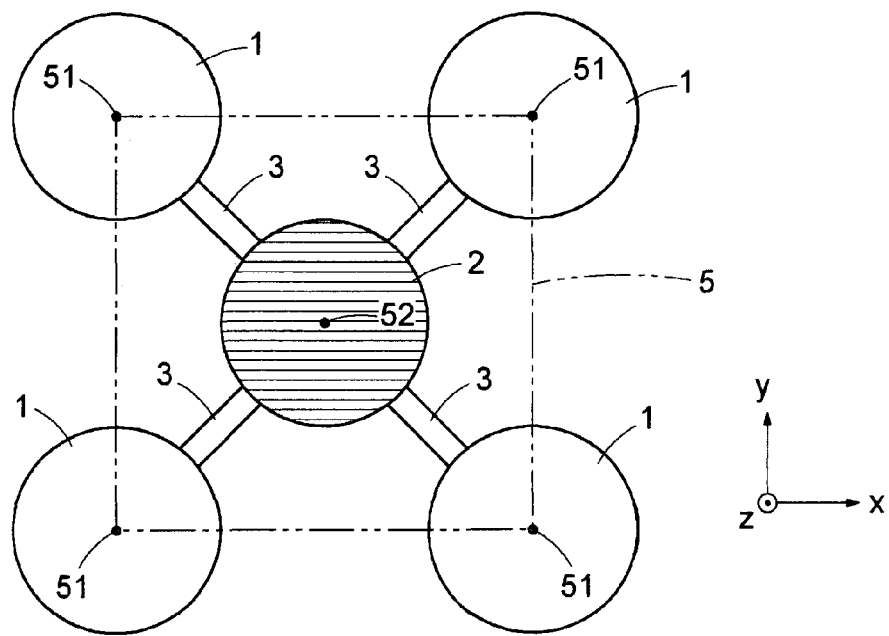
FIG. 5 is an enlarged plan view showing the metamaterial 6 from above, in which only the first particles 1 and the second particle 2 on an upper face of a unit cell 5 are displayed.

The unit cell 5 takes the shape of a cube having eight vertices 51 and six faces. A central point of each face is referred to as a face center point 52. The center of the cube forming the unit cell 5 is referred to as a center point 50. These points are shown in FIGS. 4 and 5. A first particle 1 having the vertex 51 at its center is disposed in the position of each of the eight vertices 51 of the unit cell 5. Further, a second particle 2 having the face center point 52 at its center is disposed in the position of each of the six face center points 52 of the unit cell 5. The first particles 1 and second particles 2 are connected to the center point 50 by first connecting portions 3 and second connecting portions 4. The first particles 1, second particles 2, first connecting portions 3, and second connecting portions 4 are respectively constituted by conductors (typically metal).

Note that typically, substances are divided into conductors, semiconductors, and insulators, and the magnitude of resistivity is used as an index thereof. However, the resistivity values that serve as boundary lines are not always clearly fixed. Further, the conductor according to the present invention is not limited to the conductors of this substance classification, and includes other substances having electric conductivity. In other words, the conductor according to the present invention may be a substance having larger conductivity (smaller resistivity) than an insulating material provided on the periphery thereof. For example, a substance that is typically classified as a semiconductor may function as the conductor according to the present invention. However, in a normal case, a metal exhibiting great conductivity, such as silver, copper, gold, or aluminum, is preferably employed as the conductor.

Note that in FIG. 2, the first particles 1 and second particles 2 and the first connecting portions 3 and second connecting portions 4 in the interior of the metamaterial 6 are omitted to facilitate understanding of the arrangement of the first particles 1 and second particles 2 on the surface of the metamaterial 6. However, the first particles 1 and second particles 2 and the first connecting portions 3 and second connecting portions 4 in the interior of the metamaterial 6 are displayed in relation to the single illustrated unit cell 5.

In FIG. 2, the first particles 1 are indicated by white spheres and the second particles 2 are indicated by shaded spheres. The spheres that are not allocated reference numerals likewise indicate the first particle 1 when white and the second particle 2 when shaded. Further, FIG. 2 shows an arrangement of 3×3×3=27 unit cells 5, but in an actual metamaterial, a larger number of the unit cells 5 are arranged.

Figure 3:
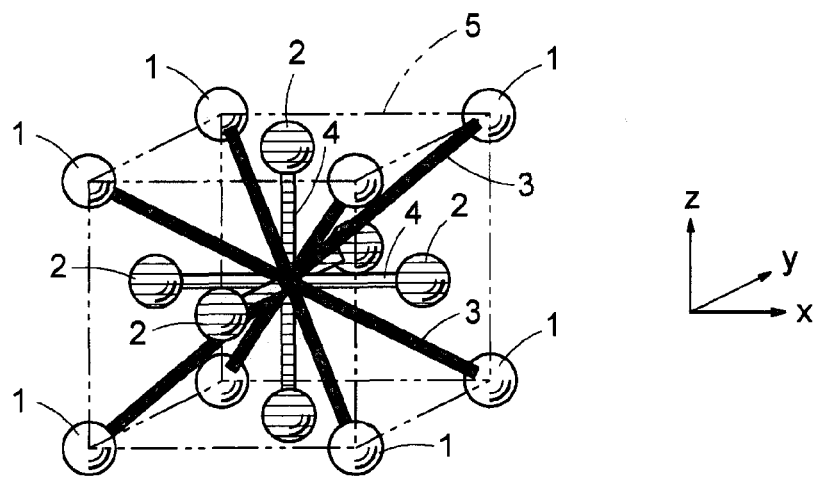
FIG. 3 is a pattern diagram showing an arrangement of first particles 1 and second particles 2.

FIG. 3 is a pattern diagram showing the arrangement of the first particles 1 and second particles 2 in the unit cell 5. Note that in FIG. 3, the first particles 1 and second particles 2 are shown to be smaller than their actual size to clarify the arrangement of and connections between the first particles 1 and second particles 2. Further, in this drawing also, the first particles 1 are indicated by white spheres and the second particles 2 are indicated by shaded spheres.

As shown in the drawing, the first particles 1 are disposed such that the respective vertices 51 of the unit cell 5 form the center thereof, while the second particles 2 are disposed such that the respective face center points 52 of the unit cell 5 form the center thereof. The arrangement of the first particles 1 and second particles 2 is identical to a face centered cubic lattice structure when described in terms of a crystal structure.

Further, each of the (eight) first particles 1 is connected to the center point 50 of the unit cell 5 by the first connecting portion 3, and each of the (six) second particles 2 is connected to the center point 50 of the unit cell 5 by the second connecting portion 4. Here, the first connecting portion 3 and the second connecting portion 4 are rod-shaped structures constituted by a conductor. In FIG. 3, the first connecting portions 3 are displayed in black and the second connecting portions 4 are shaded to facilitate differentiation thereof. In actuality, the first and second connecting portions 3, 4 may be constituted by an identical material (conductor).

All of the first particles 1 and second particles 2 are connected to the center point 50 of the unit cell 5 by the first connecting portions 3 and second connecting portions 4, and therefore the first particles 1 and second particles 2 are also connected to the center point 50 electrically. Further, the unit cells 5 are disposed repeatedly and in close contact in the xyz axis directions, and therefore eight unit cells 5 contact each other at each vertex 51. Accordingly, the first particles 1 are connected to the respective center points 50 of the surrounding eight unit cells 5. Furthermore, two unit cells 5 contact each other at each face center point 52, and therefore the second particles 2 are connected to the respective center points 50 of the two adjacent unit cells 5.

As a result of these connections, all of the first particles 1 and second particles 2 in the metamaterial 6 are electrically connected to each other. In other words, the entire metamaterial 6 forms a single conductor. Hence, constitutions for insulating conductors from each other are not required, and as a result, structural simplification can be achieved. Moreover, since the structure of the metamaterial 6 is a face centered cubic lattice structure, the metamaterial 6 exhibits great mechanical strength.

FIG. 4 is an enlarged plan view showing the metamaterial 6 from above (a z axis+side). The enlargement centers on a single unit cell 5. The unit cell 5 is indicated by dot-dot-dash lines, and the vertices 51, face center points 52, and center point 50 of the unit cell 5 are also shown. The unit cell 5 is cubic. Further, to facilitate understanding of the internal constitution of the unit cell 5, the second particle 2 at the face center point of the upper face of the unit cell 5 has been omitted. The first particles 1 are connected to the center point 50 of the unit cell 5 by the first connecting portions 3, and the second particles 2 are connected to the center point 50 of the unit cell 5 by the second connecting portions 4.

FIG. 5 is also an enlarged plan view showing the metamaterial 6 from above (a z axis+side), in which only the first particles 1 and the second particle 2 on the upper face of the unit cell 5 are displayed. The first particles 1 are disposed on the respective vertices 51 of the upper face, while the second particle 2 is disposed at the face center point 52. The arrangement of the first particles 1 and the second particle 2 shown in FIG. 5 is applicable not only to the upper face but to all six faces of the unit cell 5.

Note that here, the first connecting portion 3 and second connecting portion 4 are formed from square rods having a square cross-section, but may take another shape such as a circular column or a polygonal column. Further, the first particle 1 and second particle 2 are shown to be spherical here, but may be constituted by cubes, polyhedrons, or particles having an arbitrary shape surrounded by a flat surface or a curved surface.

When the length of one side of the unit cell 5 is represented by a dimension P, the dimension P also serves as an arrangement pitch of the unit cell 5. When a radius of the sphere forming the first particle 1 and second particle 2 is represented by a dimension r, the dimension r is set at 0.25 P. In other words, the diameter (2r) of the sphere forming the first particle 1 and second particle 2 is 0.5 P. Further, the dimension of one side of the square cross-section of the first connecting portion 3 is set at 0.1 P, and the dimension of one side of the square cross-section of the second connecting portion 4 is set at 0.122 P. Note that here, the sectional dimension of the first connecting portion 3 differs from the sectional dimension of the second connecting portion 4, but the two sectional dimensions may be identical.

As shown in FIG. 5, the first particle 1 and second particle 2 disposed on a single face of the unit cell 5 are arranged so as not to contact each other on the face. Hence, the radius r of the first particle 1 and second particle 2 must satisfy a condition of $r < \sqrt{2} \times P/4 = 0.3536$ P. Note that in this conditional expression, the square root of 2 is expressed as $\sqrt{2}$. In actuality, the dimension r is preferably within a range of 0.2 P to 0.3 P.

The metamaterial 6 described above possesses capacitance between the adjacent first particles 1 and second particles 2 and inductance generated by the first connecting portions 3 and second connecting portions 4. The manner in which the capacitance and inductance generate the left-handed characteristic of the metamaterial 6 is not yet clearly understood. However, in a specific frequency region, the metamaterial 6 exhibits the characteristics of a left-handed material, as shown by electromagnetic field simulation results to be described below.

To describe a specific example of the dimensions of each part of the metamaterial 6, the dimension P of one side of the unit cell 5 is set at 10.0 mm, the radius r of the spheres constituting the first particle 1 and the second particle 2 is set at 2.5 mm, the dimension of one side of the square cross-section of the first connecting portion 3 is set at 1.0 mm, and the dimension of one side of the square cross-section of the second connecting portion 4 is set at 1.22 mm. The metamaterial 6 having these dimensions and arranged in the manner described above exhibits the characteristics of a left-handed material in the vicinity of 14.54 to 14.71 GHz, as will be described below. Note that these dimensions are merely examples, and may be set as desired. By modifying the dimensions and arrangement of the metamaterial, the frequency at which the metamaterial exhibits the characteristics of a left-handed material also varies.

Figure 6:
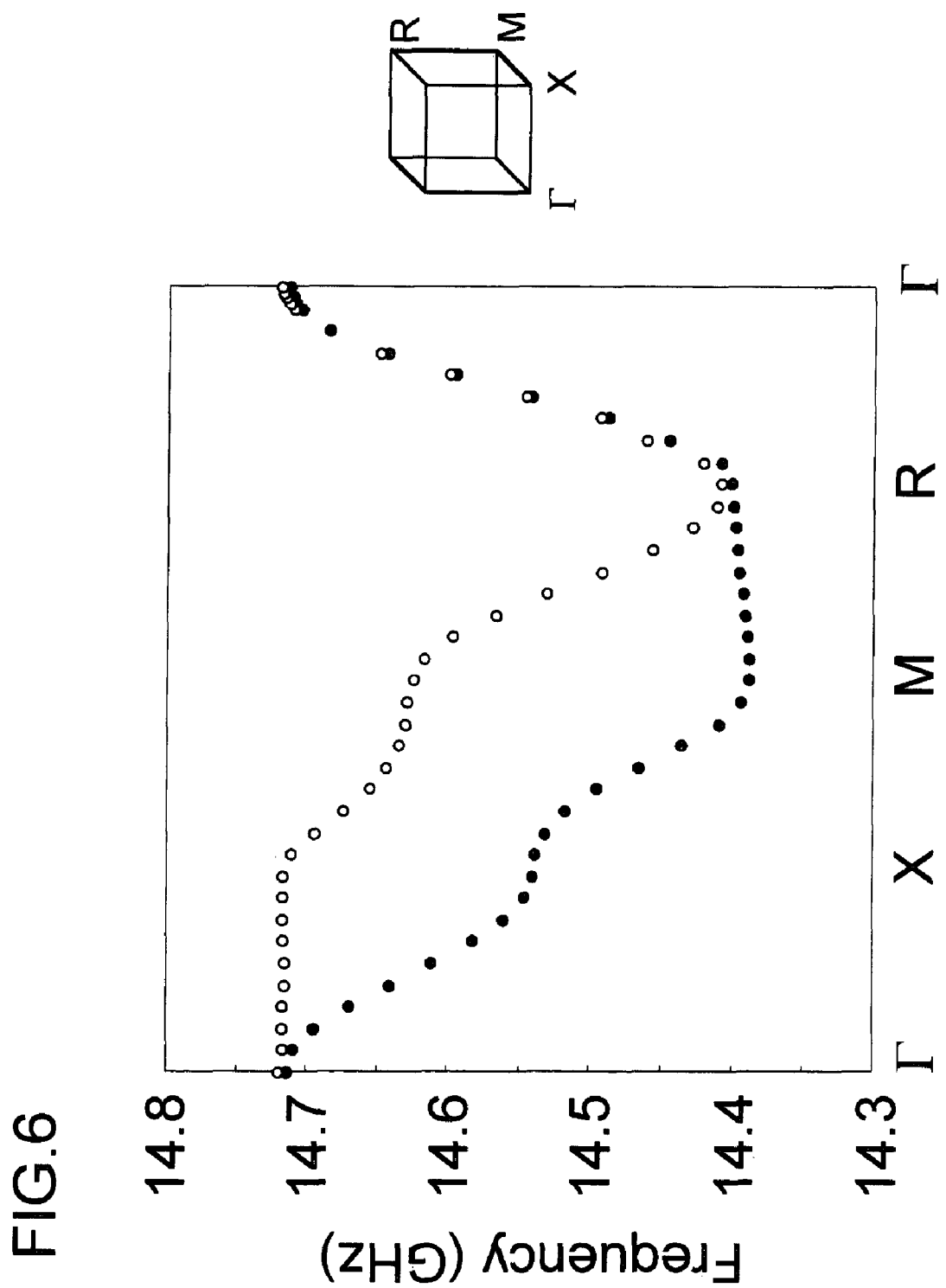
FIG. 6 is a graph showing a dispersion characteristic of the metamaterial 6.

FIG. 6 shows a dispersion characteristic of the metamaterial 6 having the dimensions and arrangement described above. FIG. 6 shows the results of an electromagnetic field simulation performed in accordance with a finite element method calculated by applying periodic boundary conditions in the x, y and z axis directions of the unit cell 5 shown in FIGS. 3 to 5. Here, the conductor is considered to be a perfect conductor, and the resistivity is calculated as zero. Black dots denote a lowest order propagation mode, and white dots denote a secondary mode having the next lowest frequency.

A wave number of the x axis direction is set at $k_x$, a wave number of the y axis direction is set at $k_y$, a wave number of the z axis direction is set at $k_z$, and a propagation constant $\beta$ is $\beta=(k_x^2+k_y^2+k_z^2)^{1/2}$. On the abscissa of FIG. 6, $\Gamma$, X, M, and R respectively denote high symmetry points in the wave number ($k_x$, $k_y$, $k_z$) space, or more specifically a point $\Gamma$ (0, 0, 0), a point X ($\pi$/P, 0, 0), a point M ($\pi$/P, $\pi$/P, 0), and a point R ($\pi$/P, $\pi$/P, $\pi$/P). Note that $\pi$ is the circular constant and P is the arrangement pitch of the unit cell 5.

A $\Gamma$-X section denotes a section in which $\beta$ is varied at a relationship of $k_x=0\to\pi/P$ and $k_y=k_z=0$, and an X-M section denotes a section in, which $\beta$ is varied at a relationship of $k_x=\pi/P$, $k_y=0\to\pi/P$, $k_z=0$. Further, an M-R section denotes a section in which $\beta$ is varied at a relationship of $k_x=k_y=\pi/P$, $k_z=0\to\pi/P$, and an R-$\Gamma$ section denotes a section in which $\beta$ is varied at a relationship of $k_x=k_y=k_z$, $k_x=\pi/P\to 0$.

Further, the ordinate of FIG. 6 shows a frequency f. At an arbitrary point in the $\Gamma$-X section and the R-$\Gamma$ section of this dispersion curve, $2\pi f/\beta$ ($=\omega/\beta$, where $\omega$ is the angular frequency), which is obtained by multiplying $2\pi$ by the incline of a straight line drawn from the point $\Gamma$, indicates the phase velocity ($v_p$), while $2\pi\,\delta f/\delta\beta$ ($=\delta\omega/\delta\beta$), which is obtained by multiplying $2\pi$ by the incline of a tangent at this point, indicates the group velocity ($v_g$).

Focusing on the lowest order mode indicated by the black dots, in the $\Gamma$-X section and the R-$\Gamma$ section of this dispersion curve, the frequency shows a decreasing tendency as the absolute value of $\beta$ increases. It can therefore be seen that in these regions, a backward wave, in which the signs of the group velocity and the phase velocity are different, is propagated. The reason for this is that in this region, the metamaterial 6 exhibits the characteristics of a left-handed material. More specifically, the metamaterial 6 exhibits the characteristics of a left-handed material in the vicinity of 14.54 to 14.71 GHz.

As described above, the first connecting portion 3 and second connecting portion 4 of the metamaterial 6 are not limited to a square rod shape, and may take another shape such as a circular column or a polygonal column. Further, the frequency at which the metamaterial 6 operates as a left-handed material decreases as the thickness (sectional dimension) of the first connecting portion 3 and second connecting portion 4 is reduced, whereby the metamaterial 6 functions more favorably as a homogeneous medium.

Note that the dimensions of the unit cell 5 of the metamaterial 6 are proportional to the wavelength of an electromagnetic wave propagated by the metamaterial 6 functioning as a left-handed material in a vacuum. In other words, when the dimensions of the respective parts of the unit cell 5 are doubled, the wavelength of an electromagnetic wave propagated by the metamaterial 6 functioning as a left-handed material in a vacuum also doubles, whereby the frequency of the propagated electromagnetic wave is halved. As shown in FIG. 6, the metamaterial 6 having the dimensions described above exhibits the characteristics of a left-handed material in the vicinity of 14.54 to 14.71 GHz. A center frequency at which the metamaterial 6 operates as a left-handed material is 14.625 GHz, and a wavelength $\lambda$, of an electromagnetic wave having this frequency in a vacuum is 20.5 mm. In this case, the value of a ratio P/$\lambda$ between the dimension P of one side of the unit cell 5 of the metamaterial 6 and the wavelength $\lambda$ of a propagated electromagnetic wave in a vacuum is approximately 0.488.

As noted above, the frequency at which the metamaterial 6 operates as a left-handed material decreases as the thickness of the first connecting portion 3 and second connecting portion 4 is reduced. In this case, the value of the ratio P/$\lambda$ between the dimension P of the unit cell 5 and the wavelength $\lambda$ of the electromagnetic wave in a vacuum also decreases. As the value of the ratio P/$\lambda$ decreases, the metamaterial 6 functions more favorably as a homogeneous medium, and therefore the value of the ratio P/$\lambda$ is preferably no greater than 0.5.

Note that the unit cells 5 are preferably disposed periodically at equal intervals in the directions of the three orthogonal axes (xyz axes). However, accurate periodicity is not strictly required in the positions of the unit cells 5 and the dimensions of the respective internal structural parts thereof, and as long as the metamaterial 6 exhibits the characteristics of a left-handed metamaterial, a certain degree of positional deviation and dimensional error is permitted.

A three-dimensional stereo lithography technique may be used as a method of manufacturing the metamaterial 6 described above. In this technique, a metallic powder having a particle diameter of several tens of µm is spread out in a thin layer, whereupon high output laser light is used to fuse and cure only the required parts thereof. The metallic powder is then spread out over this layer as a subsequent thin layer, whereupon only the required parts are fused and cured in a similar manner and adhered to the lower layer. By forming successive thin layers in an arbitrary shape and laminating them together in this manner, a three-dimensional structure having a desired shape can be formed. Note that the metallic powder that is not fused and cured can be removed easily.

A three-dimensional structure having an arbitrary shape can also be formed using fusible resin or photo-curing resin instead of metallic powder through a similar laser light formation procedure. By implementing surface treatment such as metal plating on the resulting resin three-dimensional structure to make it conductive, the metamaterial 6 can be manufactured. Further, by creating metallic components corresponding to the first particle, second particle, first connecting portion and second connecting portion, and assembling the created components in a crystal model, the metamaterial 6 can be manufactured.

A lens that uses the negative refractive index of a medium may be cited as an application of a three-dimensional left-handed metamaterial. With this negative refractive index lens, the resolution of a formed image is equal to or smaller than the magnitude of the wave source, and therefore the lens operates as a so-called superlens. A superlens is a lens in which the resolution exceeds the diffraction limit (equivalent to the wavelength) of a wave. In a normal lens formed from a right-handed material, the image formation resolution increases beyond the wavelength of the wave source due to the diffraction limit of the wave.

A medium having a negative refractive index possesses a condensing function even at a simple flat plate-shaped medium boundary. Therefore, a negative refractive index lens does not necessarily have to be formed in a concave or convex curved surface shape, in contrast to a normal positive refractive index lens. However, the thickness of an optical axis direction may be varied as a concave curved surface shape. Note that the refractive index can be varied by varying the dimensions of the respective parts forming the unit cell of the metamaterial.

The metamaterial 6 according to the present invention has a face centered cubic lattice structure, but by adjusting the dimensions of the respective parts of the unit cell, anisotropy can be substantially eliminated. By eliminating anisotropy, the dependence of the refractive index value on the electromagnetic wave direction can be eliminated, and as a result, the image formation precision of the lens can be improved.

Further applications of a three-dimensional left-handed metamaterial include electromagnetic wave imaging and high resolution photolithography in a short wavelength region using the superlens described above, and various devices such as a beam scan antenna using a negative refractive index and a coupler or a resonator using a dispersion characteristic.

INDUSTRIAL APPLICABILITY

According to the present invention, a three-dimensional left-handed metamaterial that functions as a three-dimensional electromagnetic wave propagation medium and in which the equivalent permittivity and permeability of the medium simultaneously take negative values can be realized. Further, by employing this three-dimensional left-handed metamaterial, a superlens, electromagnetic wave imaging and high resolution photolithography using the superlens, and various applied equipment and devices such as a coupler or a resonator using a dispersion characteristic can be realized.

The invention claimed is:

1. A three-dimensional left-handed metamaterial structured such that cubic unit cells are disposed repeatedly in three orthogonal directions of a three-dimensional space, each unit cell comprising:
   a first particle constituted by a conductor and disposed in positions centering on respective vertices of said unit cell;
   a second particle constituted by a conductor and disposed in positions centering on face center points, which are centers of respective faces of said unit cell;
   a first connecting portion constituted by a conductor, which electrically connects said first particles to a center point of said unit cell; and
   a second connecting portion constituted by a conductor, which electrically connects said second particles to said center point.

2. The three-dimensional left-handed metamaterial according to claim 1, wherein said first particles and said second particles are spheres.

3. The three-dimensional left-handed metamaterial according to claim 2, wherein a radius of said spheres constituting said first particles and said second particles is between 0.20 and 0.30 times a dimension of one side of said unit cell.

4. The three-dimensional left-handed metamaterial according to claim 3, wherein the dimension of one side of said unit cell is no greater than 0.5 times a wavelength of a propagated electromagnetic wave in a vacuum.

5. The three-dimensional left-handed metamaterial according to claim 1, wherein said three-dimensional left-handed metamaterial is formed as a lens made of a material having a negative refractive index and functions as a lens capable of realizing a resolution that exceeds a diffraction limit.

6. The three-dimensional left-handed metamaterial according to claim 2, wherein said three-dimensional left-handed metamaterial is formed as a lens made of a material having a negative refractive index and functions as a lens capable of realizing a resolution that exceeds a diffraction limit.

7. The three-dimensional left-handed metamaterial according to claim 3, wherein said three-dimensional left-handed metamaterial is formed as a lens made of a material having a negative refractive index and functions as a lens capable of realizing a resolution that exceeds a diffraction limit.

8. The three-dimensional left-handed metamaterial according to claim 4, wherein said three-dimensional left-handed metamaterial is formed as a lens made of a material having a negative refractive index and functions as a lens capable of realizing a resolution that exceeds a diffraction limit.

* * * * *